US012699213B2

(12) United States Patent
Ma et al.

(10) Patent No.: US 12,699,213 B2
(45) Date of Patent: Aug. 4, 2026

(54) LENS ASSEMBLY WITH HIGH UNIFORM RECTANGULAR FOCUSED HALO AND METHOD OF ADJUSTING HALO SIZE USING THE SAME

(71) Applicant: Feng Chia University, Taichung City (TW)

(72) Inventors: Shih Hsin Ma, Taichung City (TW); Jing Ting Wu, Taichung City (TW)

(73) Assignee: Feng Chia University, Taichung City (TW)

( * ) Notice: Subject to any disclaimer, the term of this patent is extended or adjusted under 35 U.S.C. 154(b) by 318 days.

(21) Appl. No.: 18/436,315

(22) Filed: Feb. 8, 2024

(65) Prior Publication Data

US 2025/0085460 A1    Mar. 13, 2025

(30) Foreign Application Priority Data

Sep. 13, 2023    (TW) ................................. 112134973

(51) Int. Cl.
*G02B 3/08*        (2006.01)
*G02B 17/00*       (2006.01)
(52) U.S. Cl.
CPC ............. *G02B 3/08* (2013.01); *G02B 17/006* (2013.01)
(58) Field of Classification Search
CPC ................................. G02B 3/08; G02B 17/006
See application file for complete search history.

(56) References Cited

U.S. PATENT DOCUMENTS 6,809,869 B2 * 10/2004 Hough ................... G02B 27/09
                                                          362/268
2019/0257492 A1 * 8/2019 Motohashi ............ F21S 41/143
2022/0221717 A1 * 7/2022 Hara .................... B60K 35/233

FOREIGN PATENT DOCUMENTS

CN        213690086 U  *  7/2021
CN        116149069 B  *  6/2023   ......... G02B 27/0916

* cited by examiner

*Primary Examiner* — Lucy P Chien
(74) *Attorney, Agent, or Firm* — Best & Flanagan LLP

(57) ABSTRACT

A lens assembly with a high uniform rectangular focused halo comprises: a first lens and an adjacent second lens. The first lens includes a first incident surface, a first non-spherical surface, and a first convex array emitting surface. The first incident surface contains a light source focus, and the first convex array emitting surface consists of multiple non-spherical convex arrays having rectangular openings. The second lens includes a second concave array incident surface and a second non-spherical surface emitting surface. The second concave array incident surface consists of multiple non-spherical concave arrays having rectangular openings corresponding to the first convex array emitting surface. The lens assembly provided by the present invention allows light to pass through only one total internal reflection lens and one flat convex lens so that the energy can be focused, while maintains an ultra-high optical efficiency.

6 Claims, 8 Drawing Sheets

LENS ASSEMBLY WITH HIGH UNIFORM RECTANGULAR FOCUSED HALO AND METHOD OF ADJUSTING HALO SIZE USING THE SAME

FIELD OF INVENTION

The present invention relates to a lens assembly, more particularly to a lens assembly with a high uniform rectangular focused halo and a method of adjusting the halo size using the same.

The present invention has been developed primarily to be a lens assembly and its halo size adjusting method for adapting to conventional exposure systems for describing hereinafter with references and multiple embodiments to this application. However, it will be appreciated that the present invention is not limited to this particular method, field of use or effect.

BACKGROUND OF THE INVENTION

In recent years, innovative exposure systems on the market have primarily used Light Emitting Diodes (LEDs) as light sources. However, the light emitted by LEDs is highly divergent. Currently, most exposure systems still employ traditional light collection methods designed for mercury or halogen lamps, using a conventional parabolic mirror to collect the light. This not only results in a bulky system, but also limits the efficiency of light collection.

In the conventional exposure systems, most designs can only converge and focus the light from the source into a circular halo close to the target size to meet the uniformity requirements. However, a significant portion of the energy is not utilized outside the rectangular target area, and especially during light collection, a significant amount of rays do not enter the system. Nevertheless, there have been a few designs based on projection optics that achieve good optical efficiency and uniformity. However, these systems typically require at least four lenses, which affect the overall optical path length and assembly tolerance, resulting in increased volume, cost, and loss of light efficiency due to redundant optical components. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

To address the above large volume, high cost, and potential loss of light efficiency issues in existing exposure systems, the present invention provides a first concept of a lens assembly with a high uniform rectangular focused halo comprising: a first lens and an adjacent second lens, wherein:

The said first lens includes a first incident surface, a first non-spherical surface, and a first convex array emitting surface. The first incident surface contains a light source focus, and the first convex array emitting surface consists of multiple non-spherical convex arrays having rectangular openings.

The said second lens includes a second concave array incident surface and a second non-spherical emitting surface. The second concave array incident surface consists of multiple non-spherical concave arrays having rectangular openings corresponding to the first convex array emitting surface.

In accordance, the present invention further provides a second concept of a method for adjusting the halo size by using the abovementioned lens assembly, including the following steps:

providing the lens assembly with a high uniform rectangular focused halo;

adjusting parameters of the lens assembly based on the following formulas (1) and (2); and directing a light source L from the light source focus on the first incident surface to enter into the first incident surface and being collimated by the first lens. The light is then emitted from the first convex array emitting surface, and enters into the second concave array incident surface to be split, and finally focuses on a projection plane through the second non-spherical emitting surface to create a size-adjustable rectangular focused halo.

$$w = \left( \frac{r3}{r1(=r2)} - 1 \right) \times aw; \qquad \text{Formula (1)}$$

$$h = \left( \frac{r3}{r1(=r2)} - 1 \right) \times ah; \qquad \text{Formula (2)}$$

wherein, in formulas (1) and (2):

r1 is the curvature radius of each non-spherical convex array having the rectangular openings in the first convex array emitting surface;

r2 is the curvature radius of each non-spherical concave array having the rectangular openings in the second concave array incident surface;

r3 is the curvature radius of the second non-spherical emitting surface;

the distance between the first lens and the second lens is twice r1;

the distance between the rectangular focused halo position and the second non-spherical emitting surface is twice (2×) of r3;

aw and ah are the length and width of each non-spherical array having the rectangular openings in the first convex array emitting surface and the second concave array incident surface, respectively; and w and h are the obtained dimensions of the rectangular focused halo, respectively.

In the above method, the light source includes a visible light or an ultraviolet light. When the light source is the visible light, the material of the lens assembly with a high uniform rectangular focused halo includes plastic materials or glass materials. When the light source is the ultraviolet light, the material of the lens assembly with a high uniform rectangular focused halo includes the glass materials.

From the above description, it is apparent that the present invention has the following advantageous features and beneficial properties:

The lens assembly provided by the present invention allows the light source to pass through only one total internal reflection lens and one flat convex lens so that the energy of the light can be focused, while maintains an ultra-high optical efficiency. The design of the arrayed non-spherical surfaces with the rectangular openings in the emitting surface of the total internal reflection lens and the incident surface of the flat convex lens allows the focused light to be shaped simultaneously during the focusing process, thereby producing the uniformly focused rectangular halo having the same shape as the opening of the arrayed non-spherical surfaces.

The present invention uses the total internal reflection lens, which is particularly suitable for collecting the ultra-violet light and the Light Emitting Diode (LED) light, which can parallel the light and achieve a very high optical efficiency. When combined with the flat convex lens, the light can then be focused. Since both the total internal reflection lens and the flat convex lens are solid transparent objects, it is possible to directly manufacture the arrayed non-spherical surfaces with the rectangular openings on the emitting surface of the total internal reflection lens and the incident surface of the flat convex lens. Thus, light collection, collimation, and light shaping can be achieved in one step with two optical components to obtain the rectangular and uniformly focused halo with very high optical efficiency.

The lens system proposed by the present invention, which possesses both light converging focusing and light shaping effects, when the system is combined with the total internal reflection lens, can efficiently collimate the light from the divergent light sources, such as the Light Emitting Diodes (LEDs), and when the convex and concave arrays are used to combine with the emitting surface of the total internal reflection lens and the incident surface of the flat convex lens, which can save one to two lenses compared to conventional systems. When combined with a Digital Micro mirror Device (DMD), the system is suitable for applications in compact Digital Light Processing (DLP) projection systems or open exposure systems. As a result, this technology has the potential to reduce the size of projection systems and directly adjust the size and shape of the focused halo to match the DMD, reducing energy loss issues caused by shape mismatch between the focused halo and the DMD.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

FIGS. 3-1 to 3-8, FIGS. 4-1 to 4-8, FIGS. 5-1 to 5-8, FIGS. 6-1 to 6-8, FIGS. 7-1 to 7-8 are s diagrams of different sizes of the rectangular focused halo obtained with different r1, r2, and r3 of some preferred embodiments in accordance with the present invention; and FIG. 8 is a light field distribution chart of an optimal performance embodiment in accordance with the present invention.

DETAILED DESCRIPTION OF THE
PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

<High Uniform Rectangular Focused Halo Lens Assembly>

Figure 1:
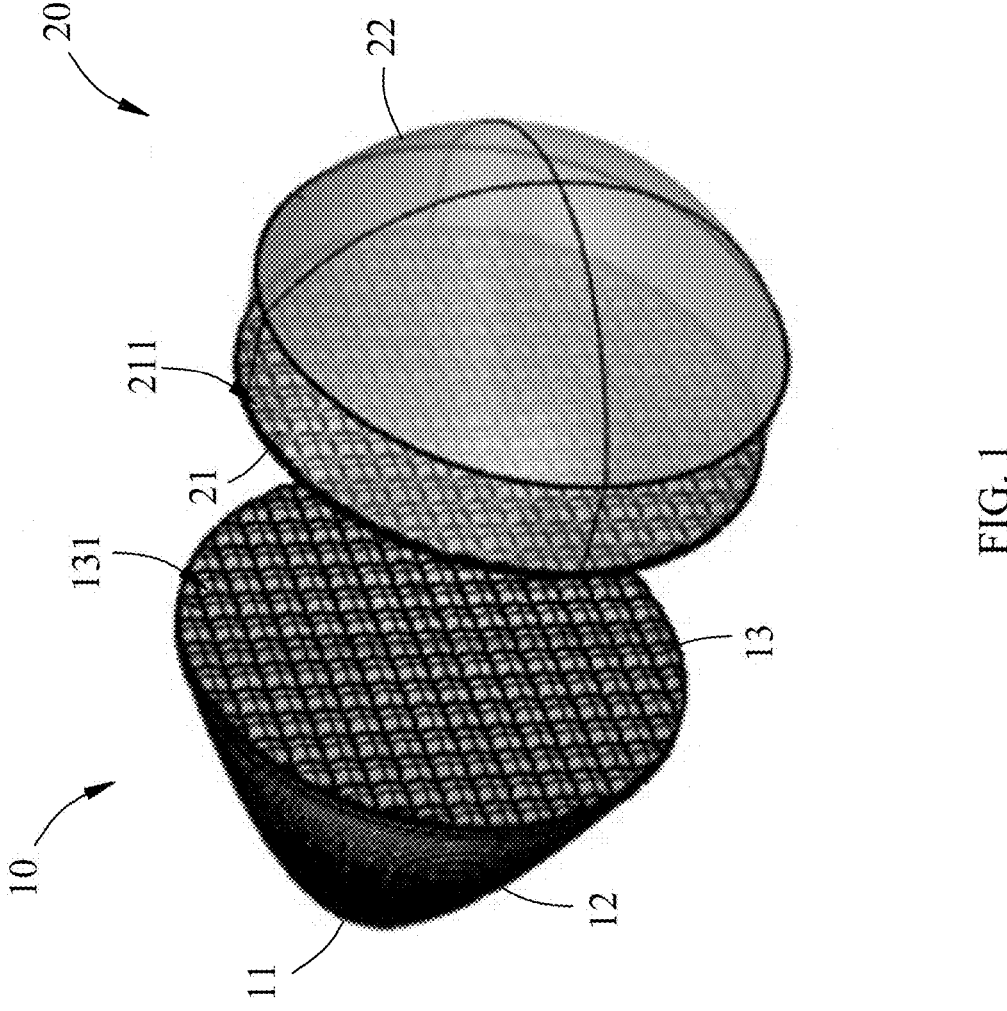
FIG. 1 is a schematic diagram of a preferred embodiment of the lens assembly with a high uniform rectangular focused halo in accordance with the present invention.

Referring to FIG. 1 for a schematic diagram of a preferred embodiment of a lens assembly with a high uniform rectangular focused halo of the present invention. The assembly comprises a first lens 10 and an adjacent second lens 20.

The first lens 10 includes a first incident surface 11, a first non-spherical surface 12, and a first convex array emitting surface 13. The first incident surface 11 contains a light source focus 111, and the first convex array emitting surface 13 consists of multiple non-spherical convex arrays having rectangular openings, wherein each non-spherical array having the rectangular openings has a curvature radius preferably between −1 mm and −10 mm, or preferably between −4 mm and −10 mm. The first lens 10 is preferably a Total Internal Reflection (TIR) lens.

The second lens 20 includes a second concave array incident surface 21 and a second non-spherical emitting surface 22. The second concave array incident surface 21 consists of multiple non-spherical concave arrays 211 having rectangular openings corresponding to the first convex array emitting surface 13. Similarly, the curvature radius of each non-spherical array having the rectangular openings in the second concave array incident surface 21 is preferably between −1 mm and −10 mm, or preferably between −4 mm and −10 mm. The curvature radius of the second non-spherical emitting surface 22 is preferably between −10 mm and −100 mm, or more preferably between −30 mm and −100 mm.

Figure 2:
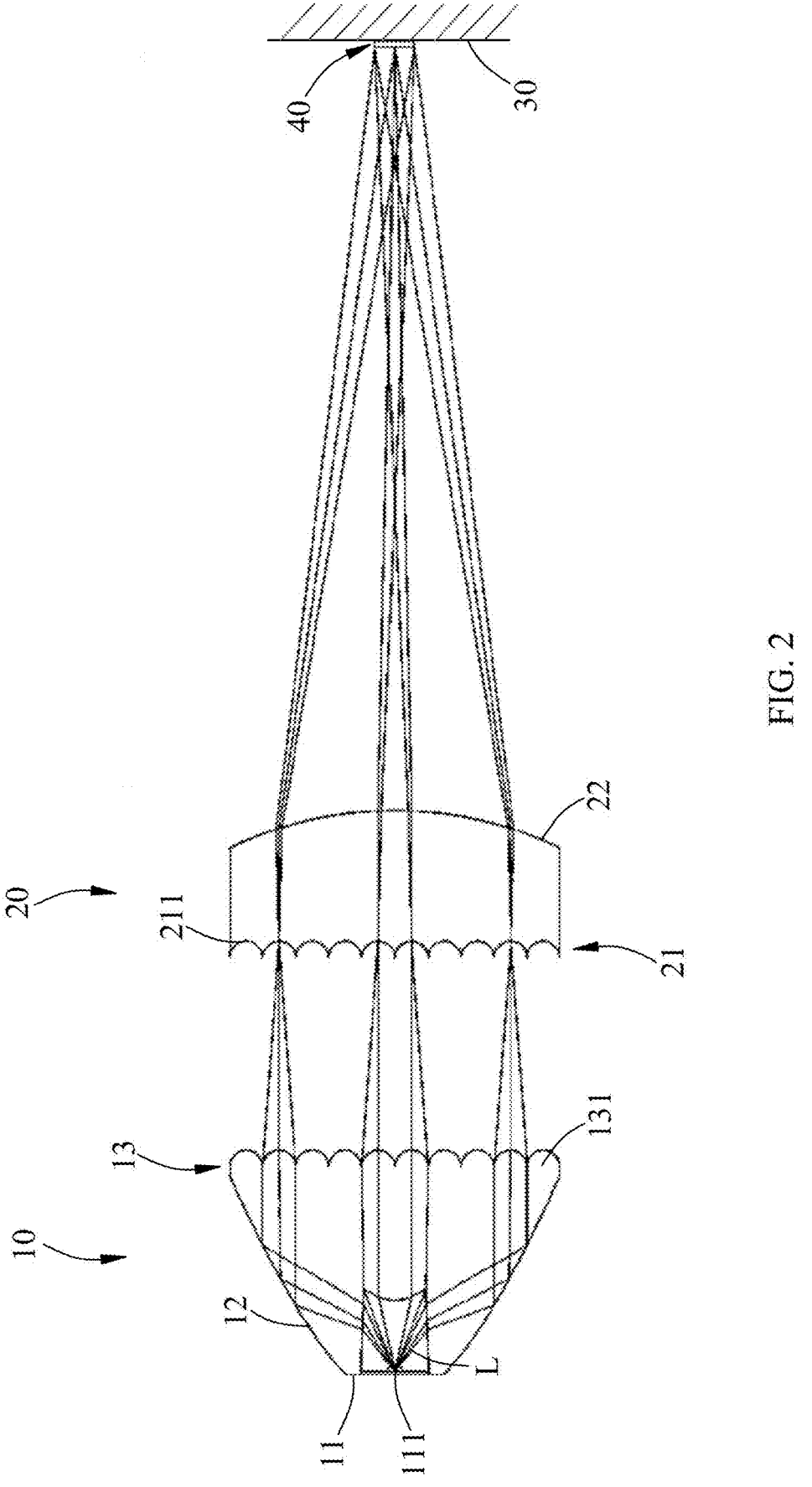
FIG. 2 is a schematic diagram of an optical path of the lens assembly in accordance with the present invention.

Referring to FIG. 2 for an optical path of the present invention. A light source L enters into the first incident surface 11 from the light source focus 111 on the first incident surface 11 and is collimated by the first lens 10. The light is then emitted from the first convex array emitting surface 13, and enters into the second concave array incident surface 21 to be split, and finally focuses on a projection plane 30 through the second non-spherical emitting surface 22 to create a rectangular focused halo 40.

<Method of Adjusting the Size of the Rectangular Focused Halo>

The present invention also provides a method of adjusting the size of the rectangular focused halo 40 corresponding to the above lens assembly. The steps include:

Step 1: Providing the lens assembly with a high uniform rectangular focused halo;

Step 2: Adjusting parameters of the lens assembly based on the following formulas (1) and (2):

$$w = \left( \frac{r3}{r1(=r2)} - 1 \right) \times aw; \qquad \text{Formula (1)}$$

-continued $$h = \left(\frac{r3}{r1(=r2)} - 1\right) \times ah; \qquad \text{Formula (2)}$$

wherein:

in the formulas (1) and (2), r1 is the curvature radius of each non-spherical array having the rectangular openings in the first convex array emitting surface 13;

r2 is the curvature radius of each non-spherical array having the rectangular openings in the second concave array incident surface 21;

r3 is the curvature radius of the second non-spherical emitting surface 22;

the distance between the first lens 10 and the second lens 20 is twice r1;

the distance between the rectangular focused halo 40 position and the second non-spherical emitting surface 22 is twice r3;

aw and ah are the length and width of each non-spherical array having the rectangular openings in the first convex array emitting surface 13 and the second concave array incident surface 21, respectively;

w and h are the obtained dimensions of the rectangular focused halo 40, respectively; and Step 3: Directing a light source L from the light source focus 111 on the first incident surface 11 to enter into the first incident surface 11 and being collimated by the first lens 10. The light is then emitted from the first convex array emitting surface 13, and enters into the second concave array incident surface 21 to be split, and finally focuses on the projection plane 30 through the second non-spherical emitting surface 22 to create the size-adjustable rectangular focused halo 40.

<Lens 10, 20 Material and Light Source L Selection>

The lens assembly of the present invention primarily uses materials with high light-transmittance and low absorption. Possible materials include plastic (or resin) materials or glass materials. The plastic materials include Polymethyl methacrylate (PMMA), Polycarbonate (PC), Polystyrene (PS), Polyethylene (PE), Cycloolefin polymer (COP), Cycloolefin copolymer (COC), Epoxy, and others. Glass materials include Flint Glass, Crown Glass, Silica Glass, Calcium Fluoride Glass (CaF$_2$), Fused Quartz, and others.

The light source L (incident light) for the present invention is primarily Light Emitting Diode (LED) light. However, depending on the lens material used, it may also select a visible light (wavelength between 380 nm and 780 nm) to an ultraviolet light.

When applied to applications where the main viewers are the human eye or a camera, such as DLP projectors, backlit display panels, AR, VR, street lighting, and inspection lighting, the present invention can use the visible light as the incident light and be combined with the plastic materials (or the resin materials) such as PMMA, PC, PS, PE, COP, COC, Epoxy, or glass materials such as Flint Glass, Crown Glass, Silica Glass.

When applied to exposure machines such as maskless exposure machines, due to the relationship between line width requirements and materials, the ultraviolet light is preferably used as the incident light and combined with glass materials such as Silica Glass, CaF$_2$, fused Quartz in the lens assembly.

<Verification Testing>

Referring to Table 1 for multiple preferred embodiments of the method of adjusting the size of the rectangular focused halo 40 using the lens assembly of the present invention. The LED is used as the light source L, and r1 and r2 are adjusted between −4 mm, −5 mm, −6 mm, −8 mm, −10 mm, and r3 is adjusted between −30 mm, −40 mm, −50 mm, −60 mm, −70 mm, −80 mm, −90 mm, −100 mm. Different sizes of the rectangular focused halo 40 are obtained. Additionally, the relative illuminance for each embodiment is calculated based on ANSI standards by comparing the minimum value at the corners of the halo and the maximum value in the center. The illuminance values at four corner points are $U_1$, $U_2$, $U_3$, and $U_4$, which are located at $\frac{1}{10}$ of the distance from the corner to the center, and the central illuminance is $U_c$, with the relative illuminance $U_r$ calculated according to Formula (3).

$$U_r = \frac{\min(U_1 \cdot U_2 \cdot U_3 \cdot U_4)}{U_c}. \qquad \text{Formula (3)}$$

The size ratio of the rectangular focused halo 40 in the present invention is mainly determined by the non-spherical array shape of each small optical surface of the rectangular openings on the first convex array emitting surface 13 and the second concave array incident surface 21. At the same time, the relative illuminance of the present invention is all above 60%.

TABLE 1

Figures 1, 2, 3, 4, 5, 6, 7, 8:
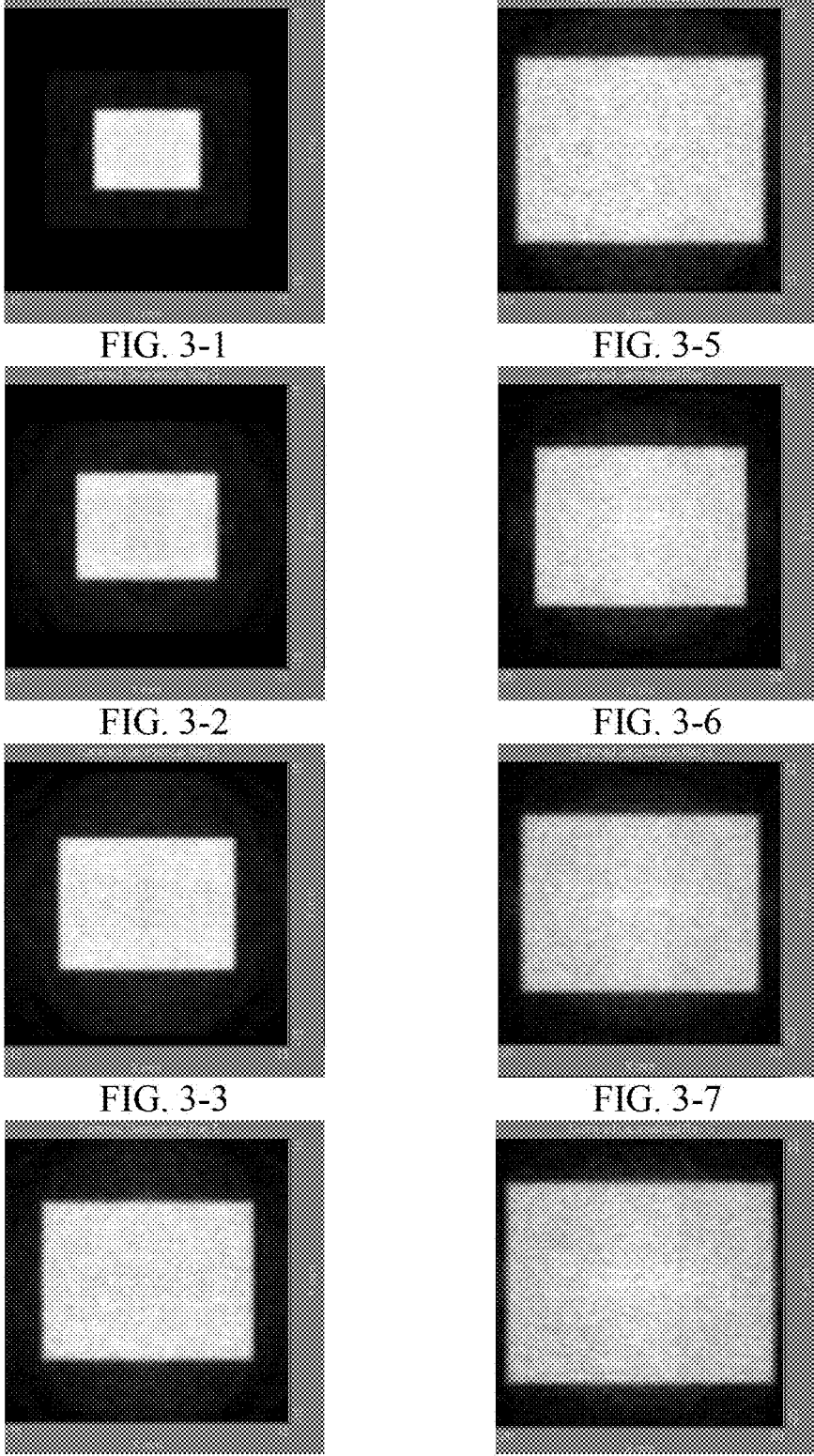
Figures 1, 2, 3, 4, 5, 6, 7, 8:
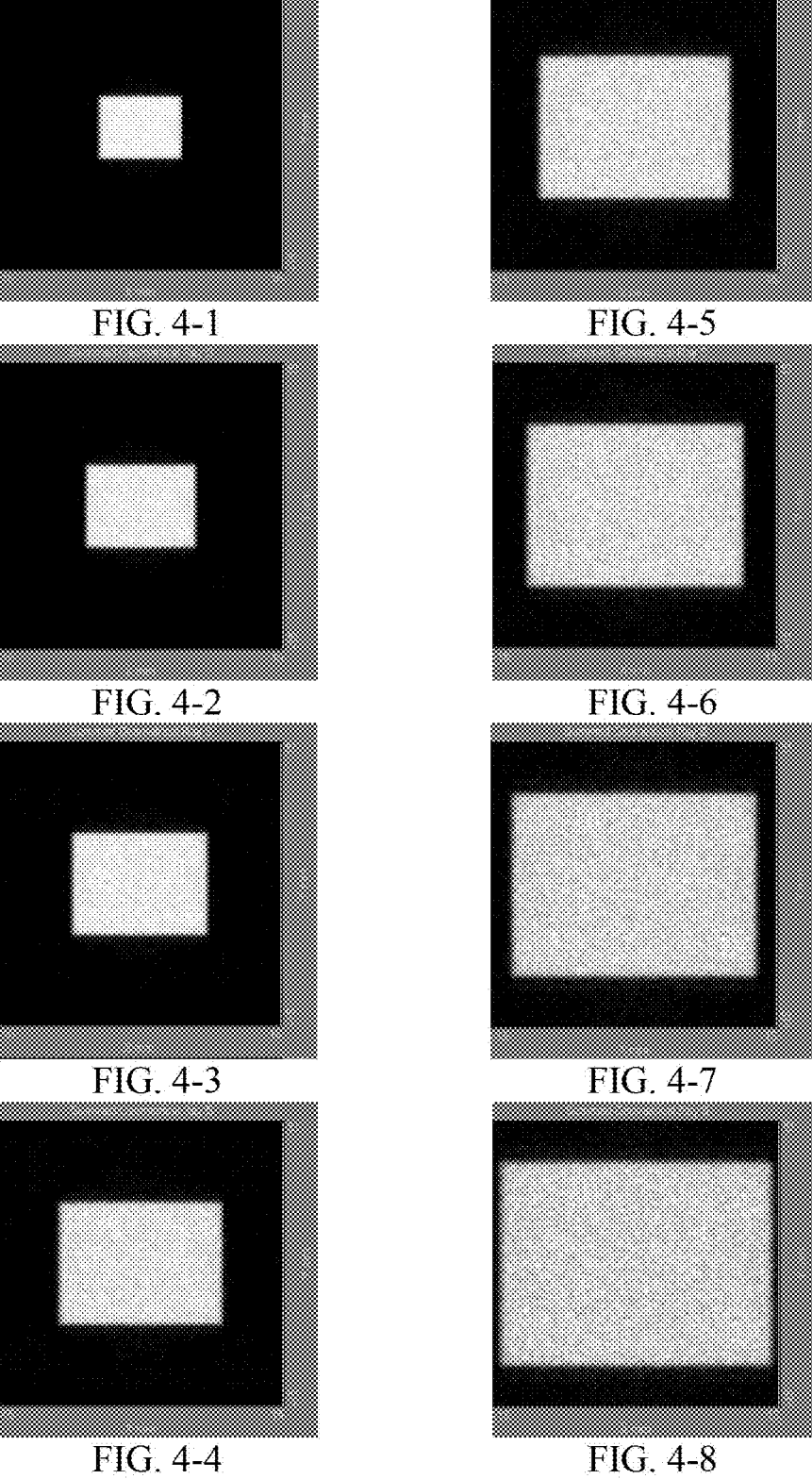
Figures 1, 5:
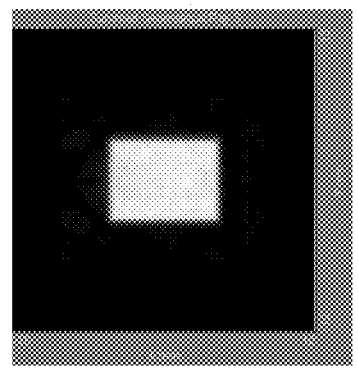
Figures 2, 5:
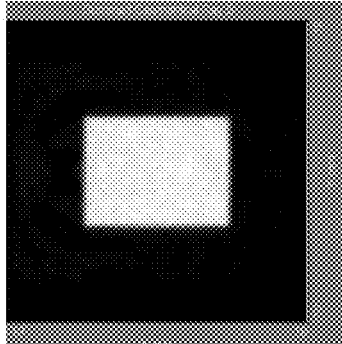
Figures 3, 5:
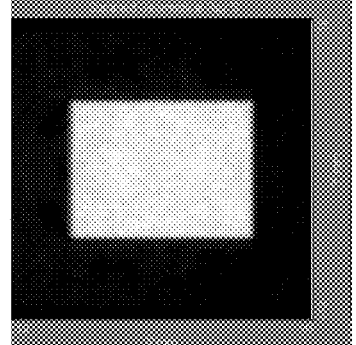
Figures 4, 5:
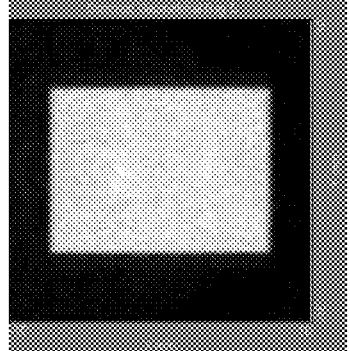
Figure 5:
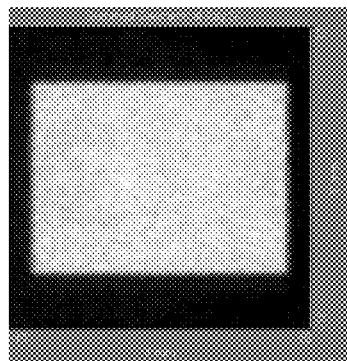
Figures 5, 6:
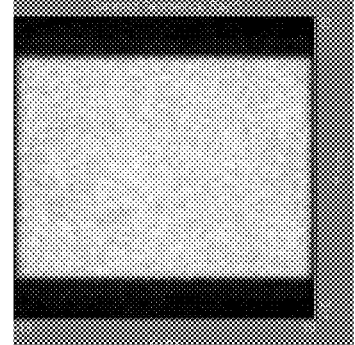
Figures 5, 6, 7:
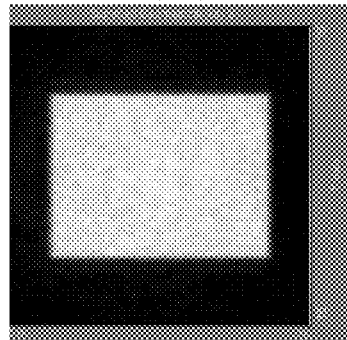
Figures 5, 6, 7, 8:
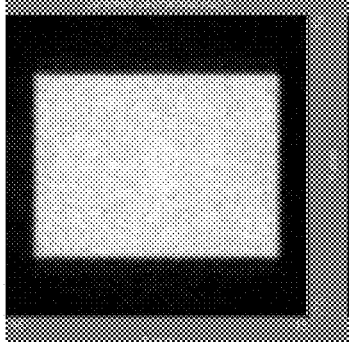
Figures 1, 6:
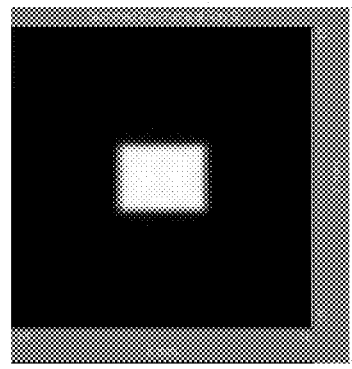
Figures 2, 6:
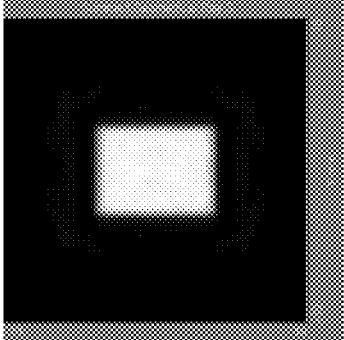
Figures 3, 6:
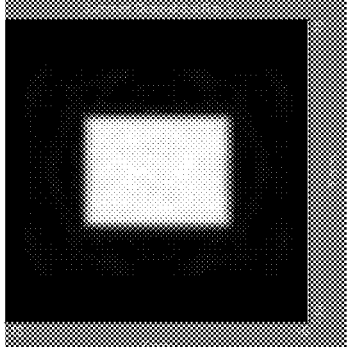
Figures 4, 6:
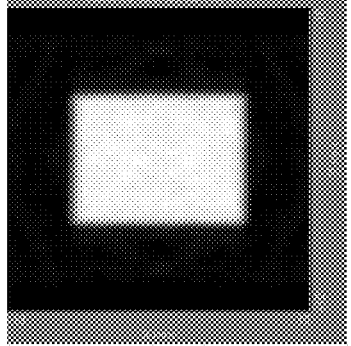
Figures 5, 6:
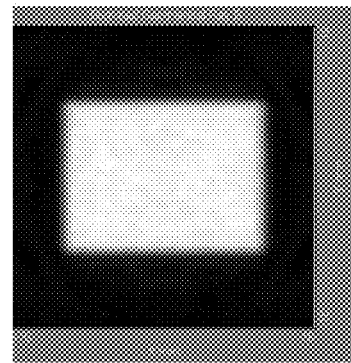
Figure 6:
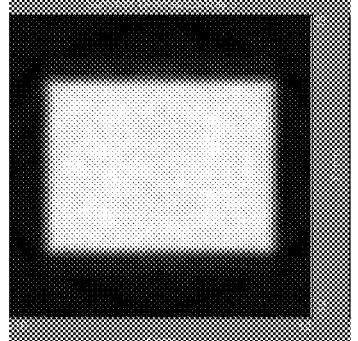
Figures 6, 7:
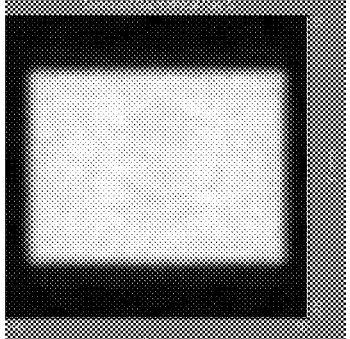
Figures 6, 7, 8:
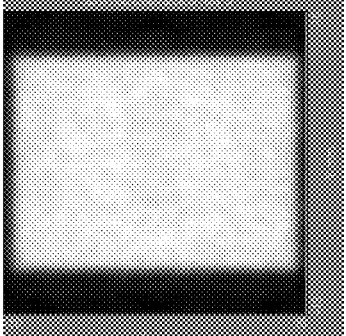
Figures 1, 2, 3, 4, 5, 6, 7, 8:
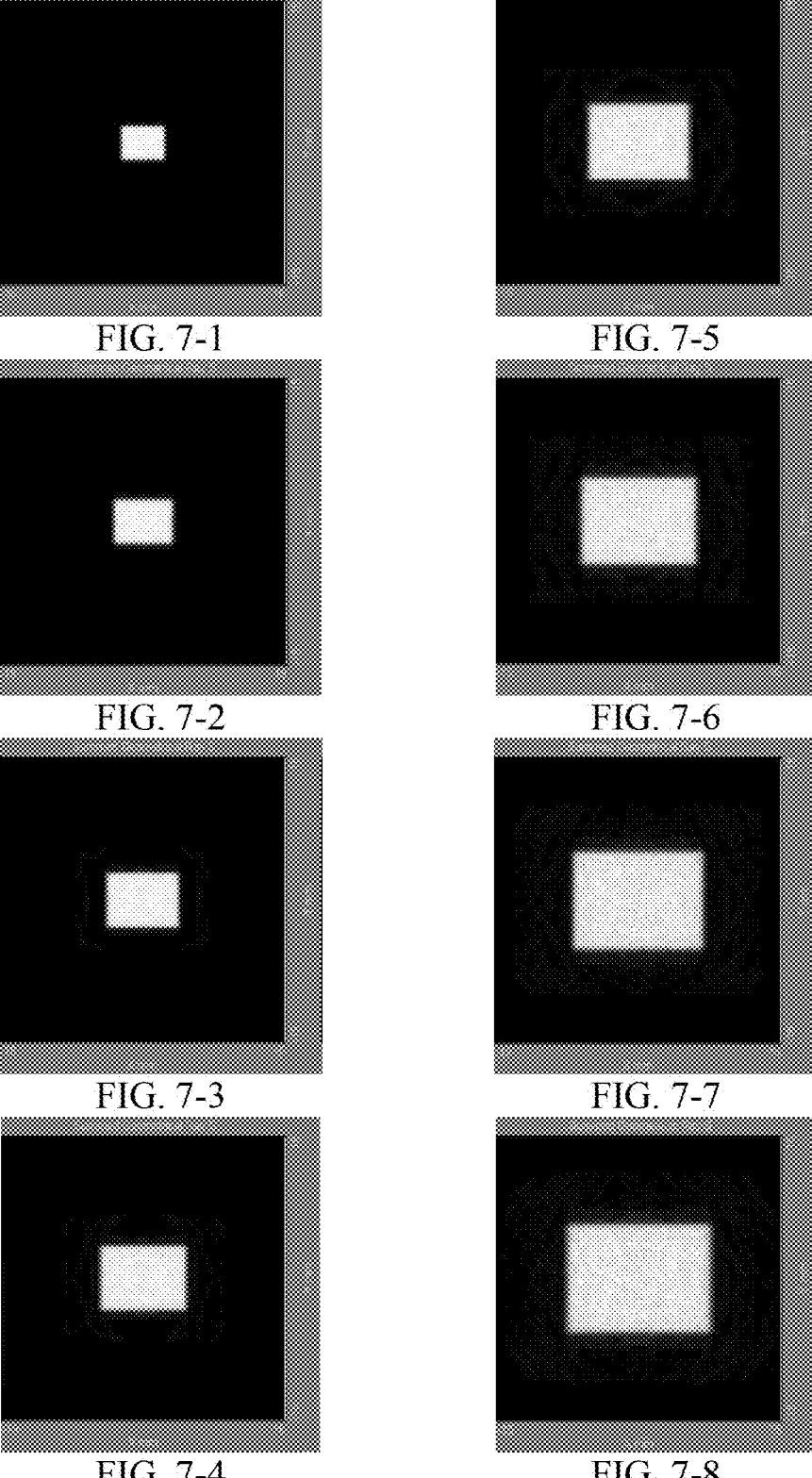
Figure 8:
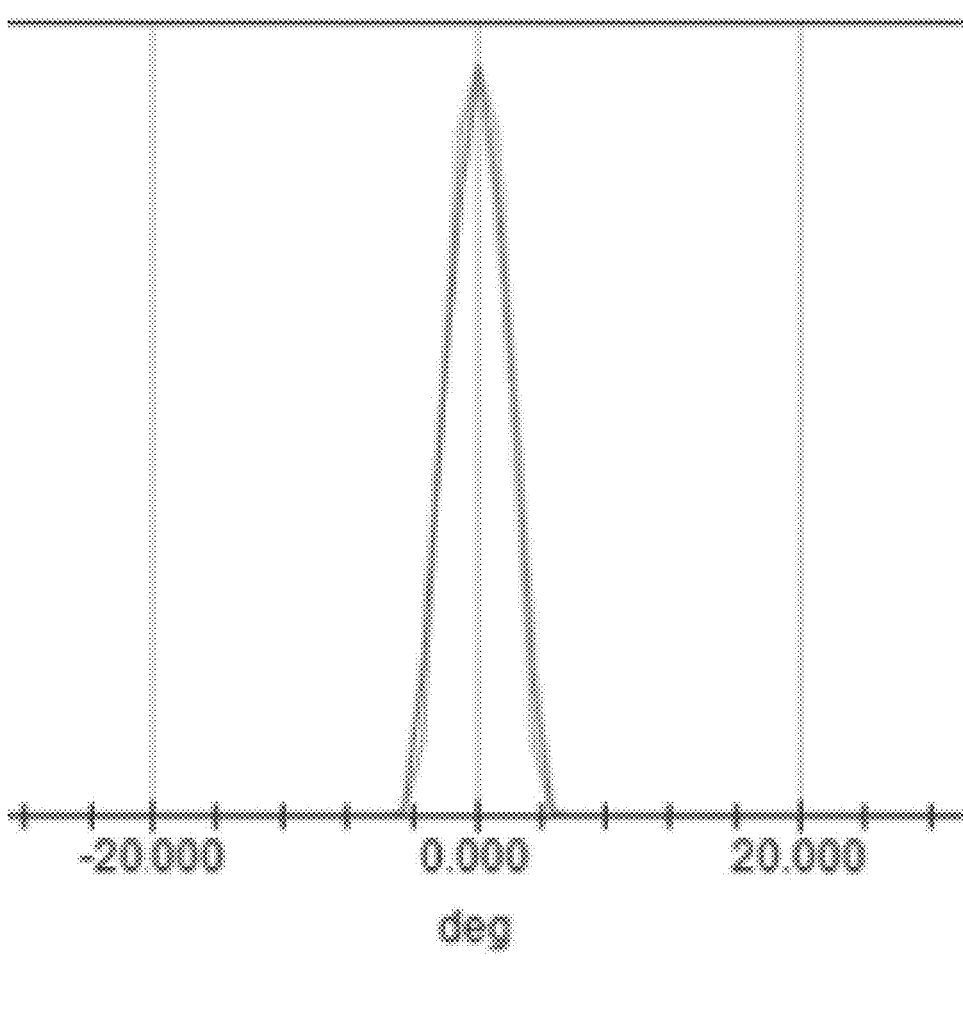

| Measurement of aw and ah | r1 and r2 (mm) | r3 (mm) | Size of the Rectangular Focused Halo (mm) | Relative Illumination (%) |
|---|---|---|---|---|
| aw: 1.5 ah: 1.125 | −4 | −30 | FIG. 3-1 w: 9.5 h: 7.3125 | 94% |
| aw: 1.5 ah: 1.125 | −4 | −40 | FIG. 3-2 w: 13.5 h: 10.125 | 99% |
| aw: 1.5 ah: 1.125 | −4 | −50 | FIG. 3-3 w: 17.25 h: 12.9375 | 94% |
| aw: 1.5 ah: 1.125 | −4 | −60 | FIG. 3-4 w: 21 h: 15.75 | 94% |
| aw: 1.5 mm ah: 1.125 mm | −4 | −70 | FIG. 3-5 w: 24.75 h: 18.5625 | 79% |
| aw: 1.5 mm ah: 1.125 mm | −4 | −80 | FIG. 3-6 w: 28.5 h: 21.375 | 75% |
| aw: 1.5 mm ah: 1.125 mm | −4 | −90 | FIG. 3-7 w: 32.25 h: 24.1875 | 74% |
| aw: 1.5 ah: 1.125 | −4 | −100 | FIG. 3-8 w: 36 h: 27 | 69% |
| aw: 1.5 ah: 1.125 | −5 | −30 | FIG. 4-1 w: 7.5 h: 5.625 | 97% |
| aw: 1.5 ah: 1.125 | −5 | −40 | FIG. 4-2 w: 10.5 h: 7.875 | 99% |
| aw: 1.5 ah: 1.125 | −5 | −50 | FIG. 4-3 w: 13.5 h: 10.125 | 92% |
| aw: 1.5 ah: 1.125 | −5 | −60 | FIG. 4-4 w: 16.5 h: 12.375 | 90% |
| aw: 1.5 mm ah: 1.125 mm | −5 | −70 | FIG. 4-5 w: 19.5 h: 14.625 | 81% |

TABLE 1-continued

| Measurement of aw and ah | r1 and r2 (mm) | r3 (mm) | Size of the Rectangular Focused Halo (mm) | Relative Illumination (%) |
|---|---|---|---|---|
| aw: 1.5 mm ah: 1.125 mm | −5 | −80 | FIG. 4-6 w: 22.5 h: 16.875 | 75% |
| aw: 1.5 mm ah: 1.125 mm | −5 | −90 | FIG. 4-7 w: 25.5 h: 19.125 | 68% |
| aw: 1.5 ah: 1.125 | −5 | −100 | FIG. 4-8 w: 28.5 h: 21.375 | 62% |
| aw: 1.5 mm ah: 1.125 mm | −6 | −30 | FIG. 5-1 w: 6 h: 4.5 | 99% |
| aw: 1.5 mm ah: 1.125 mm | −6 | −40 | FIG. 5-2 w: 8.5 h: 6.375 | 94% |
| aw: 1.5 mm ah: 1.125 mm | −6 | −50 | FIG. 5-3 w: 11 h: 8.25 | 99% |
| aw: 1.5 mm ah: 1.125 mm | −6 | −60 | FIG. 5-4 w: 13.5 h: 10.125 | 91% |
| aw: 1.5 mm ah: 1.125 mm | −6 | −70 | FIG. 5-5 w: 16 h: 12 | 92% |
| aw: 1.5 mm ah: 1.125 mm | −6 | −80 | FIG. 5-6 w: 18.5 h: 13.875 | 88% |
| aw: 1.5 mm ah: 1.125 mm | −6 | −90 | FIG. 5-7 w: 21 h: 15.75 | 89% |
| aw: 1.5 mm ah: 1.125 mm | −6 | −100 | FIG. 5-8 w: 23.5 h: 17.625 | 84% |
| aw: 1.5 mm ah: 1.125 mm | −8 | −30 | FIG. 6-1 w: 4.125 h: 3.0938 | 99% |
| aw: 1.5 mm ah: 1.125 mm | −8 | −40 | FIG. 6-2 w: 6 h: 4.5 | 98% |
| aw: 1.5 mm ah: 1.125 mm | −8 | −50 | FIG. 6-3 w: 7.875 h: 5.9063 | 98% |
| aw: 1.5 mm ah: 1.125 mm | −8 | −60 | FIG. 6-4 w: 9.75 h: 7.3125 | 94% |
| aw: 1.5 mm ah: 1.125 mm | −8 | −70 | FIG. 6-5 w: 11.625 h: 8.7188 | 93% |
| aw: 1.5 mm ah: 1.125 mm | −8 | −80 | FIG. 6-6 w: 13.5 h: 10.125 | 93% |
| aw: 1.5 mm ah: 1.125 mm | −8 | −90 | FIG. 6-7 w: 15.375 h: 11.5313 | 95% |
| aw: 1.5 mm ah: 1.125 mm | −8 | −100 | FIG. 6-8 w: 17.25 h: 12.9375 | 93% |
| aw: 1.5 mm ah: 1.125 mm | −10 | −30 | FIG. 7-1 w: 3 h: 2.25 | 98% |
| aw: 1.5 mm ah: 1.125 mm | −10 | −40 | FIG. 7-2 w: 4.5 h: 3.375 | 96% |
| aw: 1.5 mm ah: 1.125 mm | −10 | −50 | FIG. 7-3 w: 6 h: 4.5 | 96% |
| aw: 1.5 mm ah: 1.125 mm | −10 | −60 | FIG. 7-4 w: 7.5 h: 5.625 | 95% |
| aw: 1.5 mm ah: 1.125 mm | −10 | −70 | FIG. 7-5 w: 9 h: 6.75 | 94% |

TABLE 1-continued

| Measurement of aw and ah | r1 and r2 (mm) | r3 (mm) | Size of the Rectangular Focused Halo (mm) | Relative Illumination (%) |
|---|---|---|---|---|
| aw: 1.5 mm ah: 1.125 mm | −10 | −80 | FIG. 7-6 w: 10.5 h: 7.875 | 90% |
| aw: 1.5 mm ah: 1.125 mm | −10 | −90 | FIG. 7-7 w: 12 h: 9 | 91% |
| aw: 1.5 mm ah: 1.125 mm | −10 | −100 | FIG. 7-8 w: 13.5 h: 10.125 | 89% |

As shown in Table 2, calculated according to the 13-point illuminance uniformity calculation method proposed by the American National Standards Institute (ANSI), the uniformity of the rectangular focused halo for various embodiments of the present invention reaches at least 80%.

TABLE 2

| Measurement of aw and ah | r1 and r2 (mm) | r3 (mm) | Half angle (θ) | Uniformity ratio of Illuminance |
|---|---|---|---|---|
| aw: 1.5 mm ah: 1.125 mm | −4 | −30~−100 | 2°~4° | 80%~98% |
| | −5 | | | 80%~96% |
| | −6 | | | 86%~96% |
| | −8 | | | 92%~97% |
| | −10 | | | 90%~96% |

Referring to Table 3 and FIG. 8, the light field distribution chart for the optimally performing embodiment of the present invention, wherein r1 and r2 are both set at −10 mm, and r3 is set at −70 mm. Under a half-angle of light, the rectangular focused halo with 96% illuminance uniformity can be achieved.

TABLE 3

| Measurement of aw and ah | r1 and r2 (mm) | r3 (mm) | Half angle (θ) | Uniformity ratio of illuminance |
|---|---|---|---|---|
| aw: 1.5 mm ah: 1.125 mm | −10 | −70 | 2° | 96% |

The present invention proposes a Light Emitting Diode (LED) focusing projection system with optical shaping. The system is composed of one total internal reflection lens and one convex lens. The emitting surface of the total internal reflection lens is made up of numerous identical small convex surfaces, while the incident surface of the convex lens is composed of numerous identical small concave surfaces. Each small convex and concave surface has the same rectangular emitting aperture, which is arranged in pairs opposite each other. This projection system can collimate the divergent light rays from the LED through the total internal reflection lens, and then through the convex lens to split, shape, focus, and overlap the light energy onto a screen in front of the convex lens, creating the highly uniform rectangular focused halo.

<Applications>
  1. Digital Light Processor (DLP): The key component in a DLP projector is a Digital Micromirror Device (DMD), which serves as the image source for the projector. An optical system is required in front of the DMD to provide a uniform light source, with a standard requirement of over 80% light uniformity and a half-angle of light within 12 degrees. According to the tables above, the performance of uniformity and light half-angle in various embodiments of the present invention meets these requirements.

2. Maskless Exposure Machine: The key component of a maskless exposure machine is also the DMD, so the optical system is also required to provide illumination. In industrial processes, efficiency is critical, and effectively concentrating the energy emitted from the light source onto the target is important. The high light uniformity performance in various embodiments of the present invention can meet the requirements of such an application.

3. Rear Projection Display: Displays require uniform illumination to maintain image quality. The use of diffusing films can achieve a uniform effect, but a significant portion of the energy is often absorbed, and a large amount of energy is often emitted beyond the display area. The present invention can project the halo with high light uniformity to solve the above problem of energy loss.

4. Street Lighting: Street lighting requires effective control of the light source within the target area. This is important both for efficiency and to avoid shining light into the eyes of pedestrians, causing a potential hazard. In addition, uniform illumination is necessary to enhance the quality of road use. This applies not only to street lamps, but can also be applied to vehicle headlights. The present invention can project the focused and highly uniform halo of light, making it well-suited for excellent lighting applications.

5. Inspection Lighting: In various industrial inspections and microscopic observations, uniform lighting is essential for maintaining measurement accuracy. The present invention can project the focused and highly uniform halo for excellent lighting purposes.

6. Augmented Reality (AR) and Virtual Reality (VR): Near-eye displays require both brightness and uniformity to simultaneously present real-world images and clear virtual images. Effective utilization of light not only provides a sufficiently bright light source, but also avoids overloading the light source. The present invention, without limiting aperture size, possesses the capability to be applied in near-eye displays.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A method of adjusting a halo size of a lens assembly with a high uniform rectangular focused halo, comprising the following steps:

providing the lens assembly with a high uniform rectangular focused halo; wherein the lens assembly with a high uniform rectangular focused halo, comprising:

a first lens and an adjacent second lens, wherein, the first lens includes a first incident surface, a first non-spherical surface, and a first convex array emitting surface, and the second lens includes a second concave array incident surface and a second non-spherical surface emitting surface; wherein the second concave array incident surface consists of multiple non-spherical concave arrays having rectangular openings corresponding to the first convex array emitting surface;

adjusting parameters of the lens assembly with a high uniform rectangular focused halo based on the following formulas (1) and (2); and directing a light source L from the light source focus on the first incident surface to enter into the first incident surface and being collimated by the first lens, emitting from the first convex array emitting surface and entering into the second concave array incident surface to be split, and finally focusing on a projection plane through the second non-spherical emitting surface to create a size adjustable rectangular focused halo;

$$w = \left( \frac{r3}{r1(=r2)} - 1 \right) \times aw; \qquad \text{Formula (1)}$$

$$h = \left( \frac{r3}{r1(=r2)} - 1 \right) \times ah; \qquad \text{Formula (2)}$$

wherein, in formulas (1) and (2):

r1 is the curvature radius of each non-spherical convex array having the rectangular openings in the first convex array emitting surface;

r2 is the curvature radius of each non-spherical concave array having the rectangular openings in the second concave array incident surface;

r3 is the curvature radius of the second non-spherical emitting surface;

the distance between the first lens and the second lens is twice r1;

the distance between the rectangular focused halo position and the second non-spherical emitting surface is twice r3;

aw and ah are the length and width of each non-spherical array having the rectangular openings in the first convex array emitting surface and the second concave array incident surface, respectively; and w and h are the obtained dimensions of the rectangular focused halo, respectively.

2. The method of adjusting the halo size of the lens assembly with a high uniform rectangular focused halo according to claim 1, further comprising: the light source includes a visible light or an ultraviolet light; when the light source is the visible light, the material of the lens assembly with a high uniform rectangular focused halo includes plastic materials or glass materials; when the light source is the ultraviolet light, the material of the lens assembly with a high uniform rectangular focused halo includes the glass materials.

3. The method of adjusting the halo size of the lens assembly with a high uniform rectangular focused halo according to claim 1, wherein the curvature radius of each non-spherical convex or concave array with the rectangular openings is between −1 mm and −10 mm.

4. The method of adjusting the halo size of the lens assembly with a high uniform rectangular focused halo according to claim 3, wherein the curvature radius of each non-spherical convex or concave array with the rectangular openings is between −4 mm and −10 mm.

5. The method of adjusting the halo size of the lens assembly with a high uniform rectangular focused halo according to claim 1, wherein the first lens is a Total Internal Reflection (TIR) lens.

6. The lens assembly with a high uniform rectangular focused halo according to claim 1, wherein the curvature radius of the second non-spherical emitting surface is between −10 mm and −100 mm.

* * * * *